(No Model.)
J. P. DUVAL.
FRUIT DRIER.
No. 512,100. Patented Jan. 2, 1894.
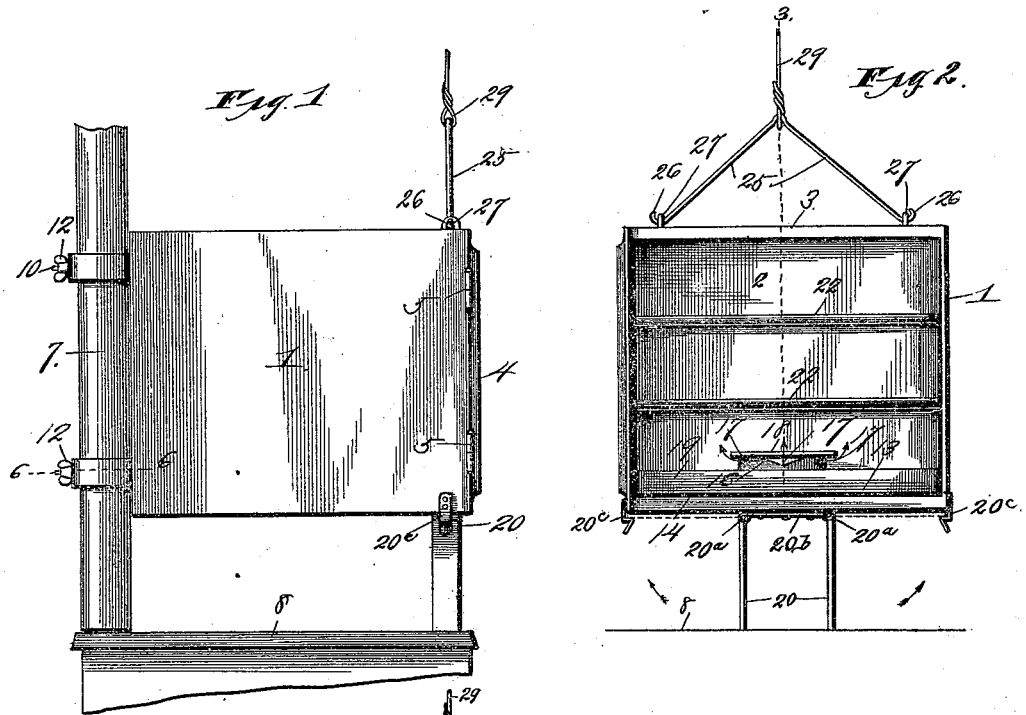
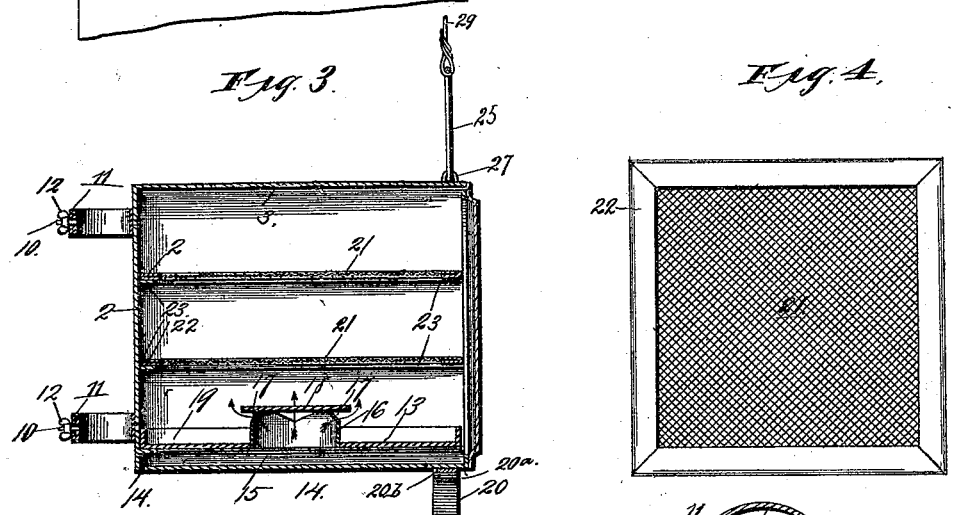
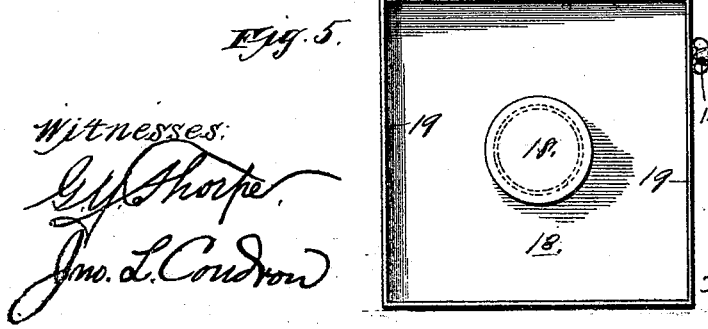
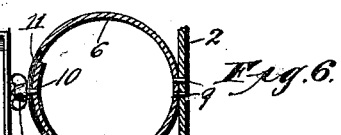
Witnesses:
G. J. Thorpe
Jno. L. Coudron
Inventor:
Jennie P. Duval,
By Higman & Higdon
attys.

UNITED STATES PATENT OFFICE.

JENNIE P. DUVAL, OF RICHMOND, MISSOURI.

FRUIT-DRIER.

SPECIFICATION forming part of Letters Patent No. 512,100, dated January 2, 1894.

Application filed June 24, 1892. Serial No. 437,813. (No model.)

*To all whom it may concern:*

Be it known that I, JENNIE P. DUVAL, of Richmond, Ray county, Missouri, have invented certain new and useful Improvements in Fruit-Driers, of which the following is a full, clear, and exact description, reference being had to the accompanying drawings, forming a part hereof.

My invention relates to appliances for removing the natural moisture from fruits, vegetables and similar articles of food.

The objects of my invention are to produce a fruit drier which shall be simple and compact, durable and inexpensive of construction, also very rapid and effective in its action and which shall, furthermore be capable of application to various forms or types of stoves or other heaters.

To the above purposes, my invention consists in certain peculiar and novel features of construction and arrangement as hereinafter described and claimed.

In order that my invention may be fully understood, I will proceed to describe it with reference to the accompanying drawings forming a part hereof.

Figure 1, is a side elevation of the upper portion of a stove and its smoke-pipe, with one of my fruit driers in operative position thereon. Fig. 2, is a front elevation of the same with its drier in open position. Fig. 3, is a vertical longitudinal section of the same on the line 3—3 of Fig. 2. Fig. 4, is a detached plan view of one of the supporting partitions for the fruit to be dried. Fig. 5, is a detached plan view of the removable bottom piece of the drier. Fig. 6, is a horizontal sectional view on the line 6—6 of Fig. 1.

In said drawings, 1 designates the two sides, 2 the back, and 3 the top of the casing of the fruit drier, this casing being shown as of rectangular form and it being understood that the casing is preferably of sheet metal, although it may be permissibly of any other suitable material. The front of the casing is provided with a door 4 which is shown as hinged at one side as at 5, to the corresponding side 1 of the drier casing. From the back 2 of the casing, extend two or any other suitable number of annular bands 6 which are designed to embrace the smoke-pipe 7 of the stove or other heater, the upper part of such a stove or heater being shown at 8. Each of these rings or bands 6 is shown as secured to the back 2 of the drier casing by suitable rivets 9 and the outer part of each ring or band is shown as composed of two over-lapping ends, one of which carries an outwardly extending clamping pin 10. These clamping pins extend each through a longitudinal slot 11 which is formed in the outer end of the over-lapping portion of the ring or band and upon the outer end of each of the clamping pins is mounted a clamping nut 12. The arrangement is such that the bands may be opened and sprung together around the stove pipe or other vertical support and their ends clamped together firmly so as to retain the casing in proper position above the heater or stove.

Within the lower part of the heater casing is located a removable bottom piece 13 which conforms in dimensions with the internal area of the casing and which rests removably upon horizontal flanges or ribs 14 which extend inwardly from the sides and back of the casing. This removable bottom piece is formed at its middle with an opening 15 which is surrounded by an upwardly extending continuous flange 16; the upper end of this flange being formed with a number of V-shaped recesses 17 and a horizontal cap or deflector 18 being attached to and resting upon the upper end of the flange 16. The outer margin of this removable bottom piece 13 is preferably formed with an upwardly extending flange 19 which lies closely against the inner surface of the sides and back of the casing. This construction of the removable bottom piece 13, with the marginal flange 19 and flange 16, forms a removable drip-pan.

The front portion of the casing is provided with a pair of legs or supports 20 which are hinged, as at 20ª to a cross bar 20ᵇ and sustain the casing in proper horizontal position and slightly above the top of the heater or stove 8. A pair of spring catches 20ᶜ are secured to opposite sides of the drier, and serve to retain the legs 20 in raised position when not in use, as shown in dotted lines in Fig. 2. It will thus be seen that the heated air from the heater or stove 8 will rise through the opening 15 of the removable bottom piece 13, pass thence upward through the flange 16 and be deflected outward and laterally through the recesses 17 by the cap or deflector 18 and finally enter the interior of the drier casing. Immediately above the bottom 13 are placed a number of horizontal foraminous partitions or supports 21, each of which is shown as consisting of a central portion of wire-cloth which is inclosed by a suitable frame 22, these frames resting upon suitable horizontal inwardly extending flanges or ribs 23 at the sides and back of the drier casing. I have shown two of these foraminous partitions or supports and their sustaining flanges or ribs, but it is to be understood that the precise number of such parts may be increased or diminished according as circumstances may suggest as desirable.

The fruits or vegetables to be dried are placed upon the foraminous supports 21 after having been properly prepared for drying and the door 4 having been opened for this purpose. The door 4 is then closed. The heat passing within the casing of the drier as above described thus passes upward through these foraminous partitions or supports and abstracts the moisture from the fruit or vegetables, and conveying the same out of the casing through the doorway in the front of the casing; the door 4 being opened at times for this purpose.

The removable drip-pan is designed to catch and retain all juices dripping from the fruit above, so that said juice does not reach the stove to burn and cause an unpleasant odor in the room. To suspend the drier above the stove, and support it in such position when the legs 20 are folded up against the bottom of the drier, so that kettles, pots, &c., may be placed upon the stove for use, I provide the bail 25 the lower ends of which are bent or hooked at 26 in the usual manner, to engage eyes 27 formed upon the upper side of the drier and near its front corners. A cord, chain or other flexible connection 29, is attached to the bail 25 at the lower end, and is secured to the ceiling or in any other manner at its upper end, so that the forward end of the drier will be supported, when the legs 20 are folded up against the bottom of the drier, as described.

From the above description, it will be seen that I have produced a fruit-drier, which is simple, inexpensive and compact in construction, very rapid and efficient in its operation which is also adapted to be placed upon any suitable heater or stove and which is likewise adapted for drying a great variety of fruits and vegetables.

Having thus described my invention, what I claim as new therein, and desire to secure by Letters Patent, is—

The combination with a fruit-drier, comprising a casing having a number of clamping bands at its rear side to be attached to a stove pipe, of a pair of supporting legs pivoted to the bottom of the casing, and spring catches pendent from said casing and adapted to support the legs in their folded position, and a bail pivotally connected to the top of the casing, and a supporting connection, attached to said bail, and adapted to support the forward end of the drier when the legs are in their folded position, substantially as set forth.

In testimony whereof I affix my signature in the presence of two witnesses.

JENNIE P. DUVAL.

Witnesses:
C. T. GARNER, Jr.,
FRANK P. DIVELBISS.